(12) United States Patent
Kim et al.

(10) Patent No.: US 10,802,334 B2
(45) Date of Patent: Oct. 13, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Dong-Hwi Kim, Paju-si (KR); Ki-Seong Kim, Paju-si (KR); Hyun-Min Park, Paju-si (KR); Kyu-Hwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/140,817

(22) Filed: Sep. 25, 2018

(65) Prior Publication Data
US 2019/0094616 A1 Mar. 28, 2019

(30) Foreign Application Priority Data
Sep. 28, 2017 (KR) .......................... 10-2017-0125711

(51) Int. Cl.
G02F 1/00 (2006.01)
G02F 1/13357 (2006.01)
F21V 8/00 (2006.01)
G02F 1/1345 (2006.01)

(52) U.S. Cl.
CPC ..... G02F 1/133603 (2013.01); G02B 6/0051 (2013.01); G02B 6/0055 (2013.01); G02F 1/13452 (2013.01); G02F 1/133605 (2013.01); G02F 1/133606 (2013.01); G02F 2001/133607 (2013.01)

(58) Field of Classification Search
CPC .. G02F 1/13452; G02B 6/0051; G02B 6/0055
See application file for complete search history.

(56) References Cited

U.S. PATENT DOCUMENTS 5,552,969 A * 9/1996 Murakami ............. F21S 43/51
362/520
2006/0221612 A1 10/2006 Song et al.
2008/0043463 A1 2/2008 Park et al.
(Continued)

FOREIGN PATENT DOCUMENTS

EP 1 722 267 A1 11/2006
EP 2 952 956 A2 12/2015

OTHER PUBLICATIONS

Combined Search and Examination Report issued in corresponding European Patent Application No. GB1815924.4, dated Mar. 19, 2019.

*Primary Examiner* — Y M. Quach Lee
(74) *Attorney, Agent, or Firm* — Morgan, Lewis & Bockius LLP (57) ABSTRACT

A liquid crystal display device includes a liquid crystal panel and a backlight unit under the liquid crystal panel and including a circuit board; a plurality of LED packages mounted on the circuit board; a partition wall on the circuit board and surrounding at least one LED package; an encapsulation member covering the plurality of LED packages and the partition wall; and a reflective pattern sheet over the encapsulation member and including a plurality of first reflective patterns corresponding to the plurality of LED packages, respectively, wherein a height of the partition wall is equal to or greater than a height of the at least one LED package and smaller than or equal to a thickness of the encapsulation member.

20 Claims, 8 Drawing Sheets

(56) References Cited

U.S. PATENT DOCUMENTS

| | | | |
|---|---|---|---|
| 2009/0128741 A1* | 5/2009 | Peng | G02F 1/133603 |
| | | | 362/97.2 |
| 2010/0141867 A1* | 6/2010 | Ogihara | G02F 1/133605 |
| | | | 362/97.1 |
| 2011/0228193 A1* | 9/2011 | Shin | G02F 1/133606 |
| | | | 362/249.02 |
| 2012/0300135 A1* | 11/2012 | Cho | G02B 6/0021 |
| | | | 362/609 |
| 2013/0148036 A1 | 6/2013 | Shimizu | |
| 2013/0256711 A1* | 10/2013 | Joo | H01L 33/486 |
| | | | 257/88 |
| 2017/0254518 A1* | 9/2017 | Vasylyev | F21V 17/007 |
| 2018/0023784 A1* | 1/2018 | Tamura | G02F 1/133603 |
| | | | 362/235 |

* cited by examiner

BACKLIGHT UNIT AND LIQUID CRYSTAL DISPLAY DEVICE INCLUDING THE SAME

CROSS-REFERENCE TO RELATED APPLICATION

The present application claims priority from and the benefit under 35 U.S.C § 119(a) of Korean Patent Application No. 10-2017-0125711 filed on Sep. 28, 2017, which is hereby incorporated by reference in its entirety.

BACKGROUND

Technical Field

The present disclosure relates to a backlight unit and a liquid crystal display device including the same.

Discussion of the Related Art

With rapid development of information technologies, display devices for displaying a large amount of information have been promptly developed. Recently, flat panel display devices having a thin profile, light weight and low power consumption, such as liquid crystal display devices or electroluminescent display devices, have been suggested and widely applied.

Among the flat panel display devices, liquid crystal display devices have been widely used due to their small sizes, light weights, thin thicknesses, and low power consumption. A liquid crystal display device includes a liquid crystal panel displaying an image and a backlight unit disposed under the liquid crystal panel to providing light to the liquid crystal panel.

Backlight units are classified into an edge-type and a direct-type according to a method of arranging a light source.

In an edge-type backlight unit, a light source is disposed on a side surface of a light guide plate disposed below a light crystal panel, and light emitted from the light source is converted into plane light through the light guide plate and provided to the liquid crystal panel. However, in the edge-type backlight unit, since the light source is on the side, there is a restriction in implementing a local dimming method in which the backlight unit is divided into a plurality of regions and driven for each region.

Meanwhile, in a direct-type backlight unit, a plurality of light sources are disposed under a liquid crystal display panel, and light emitted from the light sources is directly provided to an entire surface of the liquid crystal panel. In the direct-type backlight unit, uniformity and brightness of light provided to the liquid crystal panel can be improved, and the local dimming method can be implemented, so that a contrast ratio can be improved and power consumption can be reduced.

However, in the direct-type backlight unit, since the light sources are disposed under the liquid crystal display panel and light is directly provided to the liquid crystal panel, a mura such as a hot spot may occur over the light sources, and image quality may be decreased.

SUMMARY OF THE INVENTION

Accordingly, embodiments of the present disclosure are directed to a backlight unit and a liquid crystal display device including the same that substantially obviate one or more of the problems due to limitations and disadvantages of the related art.

An object of the present disclosure is to provide a backlight unit and a liquid crystal display device including the same that prevent the mura such as the hot spot and the decrease of the image quality.

Another object of the present disclosure is to provide a backlight unit and a liquid crystal display device including the same that reduce the thickness of the backlight unit and realize a thin profile.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a backlight unit comprises a circuit board; a plurality of LED packages mounted on the circuit board; a partition wall on the circuit board and surrounding at least one LED package; an encapsulation member covering the plurality of LED packages and the partition wall; and a reflective pattern sheet over the encapsulation member and including a plurality of first reflective patterns corresponding to the plurality of LED packages, respectively, wherein a height of the partition wall is equal to or greater than a height of the at least one LED package and smaller than or equal to a thickness of the encapsulation member.

In another aspect, a backlight unit comprises a circuit board; a plurality of LED packages mounted on the circuit board; a partition wall disposed among the plurality of LED packages to partially or entirely surround one or more LED packages, and changing a transmitting direction of at least 40% of the light incident on the partition wall; and a reflective pattern sheet over the plurality of LED package and including a plurality of first reflective patterns corresponding to the plurality of LED packages, respectively, wherein a height of the partition wall is equal to or greater than a height of the at least one LED package.

In another aspect, a liquid crystal display device comprises a liquid crystal panel and a backlight unit under the liquid crystal panel. The backlight unit includes a circuit board; a plurality of LED packages mounted on the circuit board; a partition wall on the circuit board and surrounding at least one LED package; an encapsulation member covering the plurality of LED packages and the partition wall; and a reflective pattern sheet over the encapsulation member and including a plurality of first reflective patterns corresponding to the plurality of LED packages, respectively, wherein a height of the partition wall is equal to or greater than a height of the at least one LED package and smaller than or equal to a thickness of the encapsulation member.

In another aspect, a liquid crystal display device comprises a liquid crystal panel and a backlight unit under the liquid crystal panel. The backlight unit includes a circuit board; a plurality of LED packages mounted on the circuit board; a partition wall disposed among the plurality of LED packages to partially or entirely surround one or more LED packages, and changing a transmitting direction of at least 40% of the light incident on the partition wall; and a reflective pattern sheet over the plurality of LED package and including a plurality of first reflective patterns corresponding to the plurality of LED packages, respectively, wherein a height of the partition wall is equal to or greater than a height of the at least one LED package.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Reference will now be made in detail to embodiments of the disclosure, examples of which are illustrated in the accompanying drawings.

Figure 1:
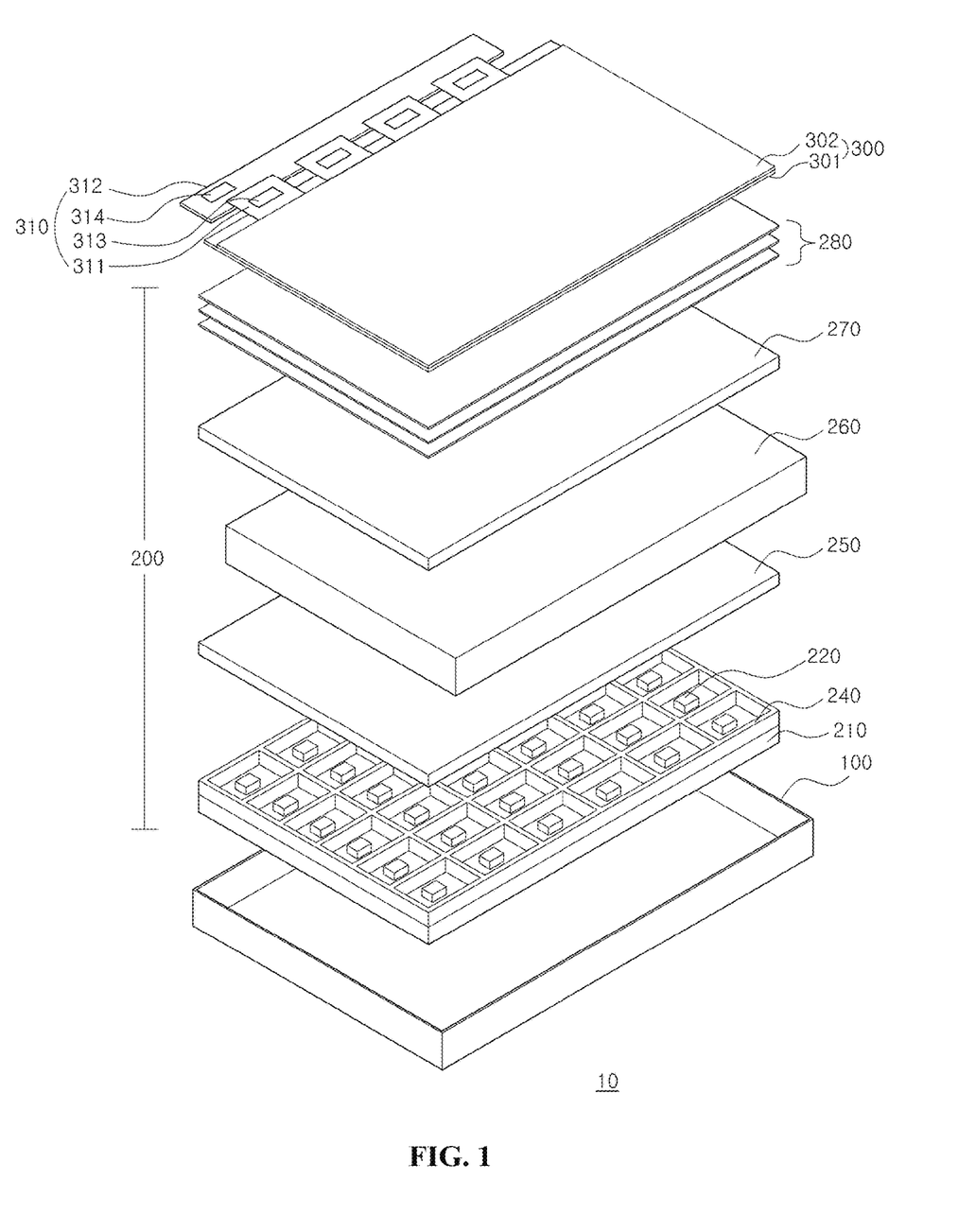
FIG. 1 is a schematic exploded perspective view of a liquid crystal display device according to an embodiment of the present disclosure.
Figure 2:
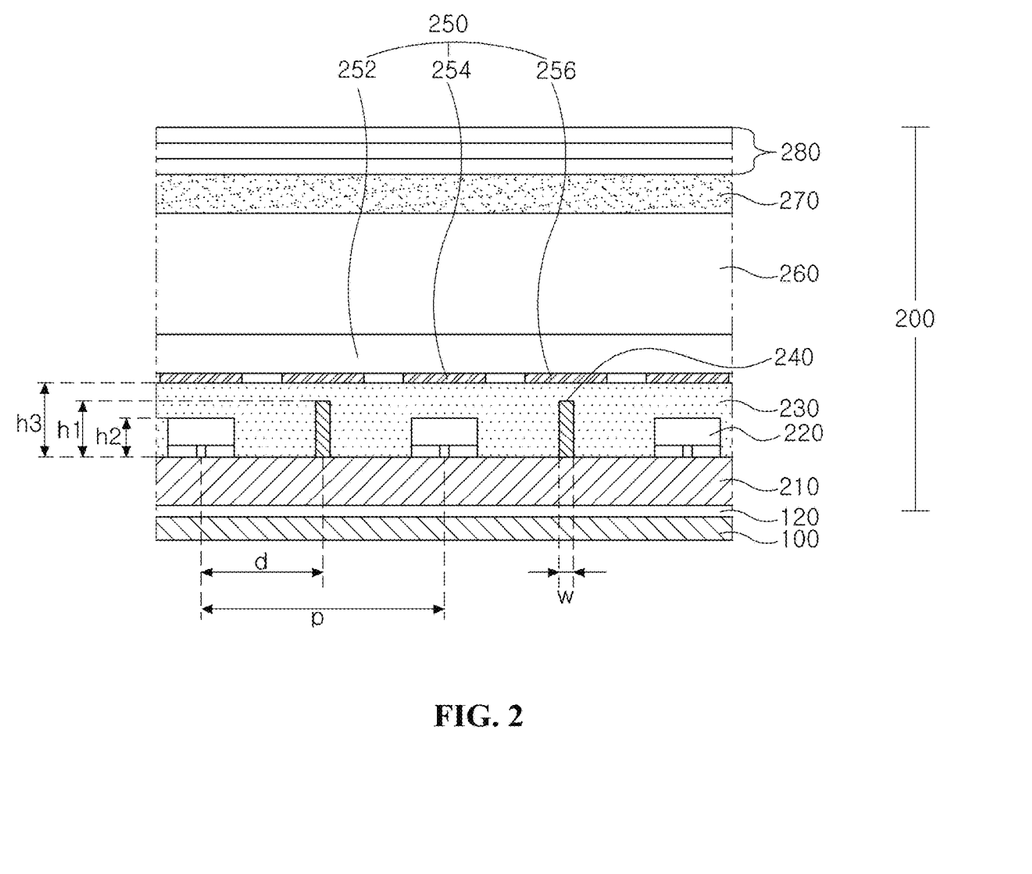
FIG. 2 is a schematic cross-sectional view of a backlight unit according to the embodiment of the present disclosure.

FIG. 1 is a schematic exploded perspective view of a liquid crystal display device according to an embodiment of the present disclosure, and FIG. 2 is a schematic cross-sectional view of a backlight unit according to the embodiment of the present disclosure.

In FIG. 1 and FIG. 2, the liquid crystal display device 10 according to the embodiment of the present disclosure includes a backlight unit 200, a liquid crystal panel 300, a panel driving circuit 310, and a bottom cover (or lower cover) 100.

The bottom cover 100 is disposed below the backlight unit 200 and supports the backlight unit 200. Here, the bottom cover 100 may be considered as a component included in the backlight unit 200.

The bottom cover 100 can be formed in a box shape with an open upper portion so as to receive the backlight unit 200 therein, but the present disclosure is not limited thereto. For example, the bottom cover 100 may be formed in a plate shape.

Meanwhile, although not shown in the figures, the liquid crystal display device 10 may further include a guide panel surrounding and supporting sides of the backlight unit 200 and the liquid crystal panel 300 and a top cover covering edges of a top surface of the liquid crystal panel 300.

The backlight unit 200 according to the embodiment of the present disclosure is a direct-type backlight unit in which a plurality of light sources, for example, light emitting diodes (LEDs) are spaced apart from each other with a predetermined distance therebetween and are disposed directly under and face the liquid crystal panel 300.

The backlight unit 200 can include a circuit board 210, a plurality of LED packages 220, an encapsulation member 230, a partition wall 240, a reflective pattern sheet 250, a diffusion plate 260, a fluorescent sheet 270, and an optical sheet 280.

The circuit board 210 is disposed on a top surface of the bottom cover 100. The circuit board 210 can be attached to the bottom cover 100 through ah adhesive member 120 such as a double-sided adhesive.

The plurality of LED packages 220 are mounted on a top surface of the circuit board 210. The top surface of the circuit board 210 can have a reflection property, for example, by forming a reflection layer on the top surface of the circuit board 210. In this case, light traveling toward the circuit board 210 can be reflected by the circuit board 210 and travel toward the liquid crystal panel 300.

The LED package 220 mounted on the circuit board 210 emits light by a driving signal supplied from a backlight driving portion (not shown).

The LED package 220 can have various structures. For example, the LED package 220 can have a lateral chip structure, a flip chip structure, a vertical chip structure, a chip scale package (CSP) structure, or the like.

The CSP structure is configured to include an LED chip and a mold surrounding the LED chip. In the CSP structure, a size of the LED package 220 can be minimized, and thus a thickness of the backlight unit 200 can be reduced.

Further, the encapsulation member (or encapsulation mold) 230 can be formed to cover an entire surface of the circuit board 210 on which the plurality of LED packages 220 are mounted. The encapsulation member 230 can be applied to the circuit board 210 to a thickness greater than that of the LED package 220 and cover all the LED packages 220 mounted on the circuit board 210. The encapsulation member 230 can stably fix the LED packages 220 on the circuit board 210 and protect the LED packages 220 from the outside.

The encapsulation member 230 can be formed of a resin-based material including silicone, UV resin, polycarbonate (PC) and polymethyl methacrylate (PMMA), for example, and the present disclosure is not limited thereto.

In the meantime, the partition wall 240 is formed between adjacent LED packages 220 on the top surface of the circuit board 210. The partition wall 240 can be configured to surround at least one LED package 220, and this will be described in detail later.

The partition wall 240 changes a path of light emitted from the LED package 220 by totally reflecting or reflecting the light, and thus prevents a halo phenomenon that occurs as the light is output beyond a local dimming region during a local dimming operation. Herein, a partition wall 240 may be disposed among the plurality of LED packages 220 to partially or entirely surround one or more LED packages. Preferably, partition wall 240 is capable of changing the transmitting direction of at least 40% of the light incident on the partition wall. More preferably, it is capable of changing the transmitting direction of at least 50%, 60%, 70%, 80%, or 90% of the incident light.

Here, a height h1 of the partition wall 240 is beneficially equal to or greater than a height h2 of the LED package 220. At this time, the height h1 of the partition wall 240 can be smaller than or equal to a height h3 of the encapsulation member 230, i.e., a thickness of the encapsulation member 230. For example, the height h3 of the encapsulation member 230 can be 300 to 1500 μm, beneficially, 300 to 600 μm, and the height h2 of the LED package 220 can be 150 to 250 μm, but the present disclosure is not limited thereto.

Preferably, a distance d between the partition wall 240 and the LED package 220, that is, a distance from a center of the partition wall 240 to a center of the LED package 220 adjacent thereto, is ½ of a pitch p of the LED package 220, that is, a distance between centers of adjacent LED packages 220.

In addition, a width w of the partition wall 240 is beneficially ⅕ to ¼ of the pitch p of the LED package 220.

The partition wall 240 can be completely covered by the encapsulation member 230 or only its side surface can be covered by the encapsulation member 230 depending on the height h1.

The diffusion plate 260 is disposed over the encapsulation member 230. The diffusion plate 260 can diffuse light emitted from the plurality of LED packages 220 and provide uniform plane light to the liquid crystal panel 300.

The reflective pattern sheet 250 having a film shape can be provided between the encapsulation member 230 and the diffusion plate 260. The reflective pattern sheet 250 can include a base substrate 252, a plurality of first reflective patterns 254 that are formed on a lower surface of the base substrate 252 and are disposed to correspond to the LED packages 220, respectively, and a plurality of second reflective patterns 256 that are formed on the on the lower surface of the base substrate 252 and are disposed to correspond to the partition walls 240, respectively. Here, the second reflective patterns 256 can be omitted.

The first reflective pattern 254 reflects a part of light, which is emitted upwardly from the corresponding LED package 220 located thereunder, and distributes the part of the light in a side direction. A remaining part of the light is transmitted by the first reflective pattern 254 and travels upwardly. Accordingly, most of the light is prevented from traveling in an upward direction vertical to the liquid crystal panel 300 and from being incident on the liquid crystal panel 300. Therefore, it is possible to prevent a hot spot caused by light incidence in the vertical upward direction, and the deterioration of the image quality due to the hot spot can be improved.

Further, the second reflective pattern 256 reflects a part of light, which is emitted from the LED package 220, totally reflected or reflected by the partition wall 240, and traveling toward an upper portion of the partition wall 240, and distributed the part of the light in a side direction. A remaining part of the light is transmitted by the second reflective pattern 256 and travels upwardly. Accordingly, the intensity of the light traveling toward the upper portion of the partition wall 240 is lowered, and a bright line is prevented from being generated. The reflective pattern 256 can have the same configuration as the first reflective pattern 254.

The first and second reflective patterns 254 and 256 can be formed on the base substrate 252 by a printing method, but the present disclosure is not limited thereto. The first and second reflective patterns 254 and 256 can be formed of a material having a reflective property, for example, metal, titanium oxide (TiO$_2$), a dichroic dye, or the like, but the present disclosure is not limited thereto.

Here, a width of the first reflective pattern 254 can be greater than or equal to a width of the LED package 220. In addition, a width of the second reflective pattern 256 can be greater than the width w of the partition wall 240. At this time, the width of the second reflective pattern 256 can be smaller than or equal to the width of the first reflective pattern 254.

Meanwhile, the first reflective pattern 254 can have different transmittances depending on a position, and this will be described with reference to FIGS. 3A to 3C.

Figure 3A:
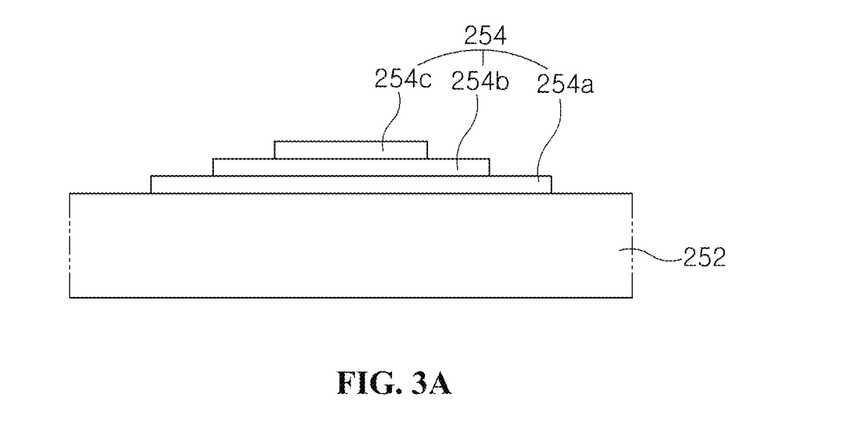
FIG. 3A is a schematic cross-sectional view of a reflective pattern sheet according to the embodiment of the present disclosure.
Figure 3B:
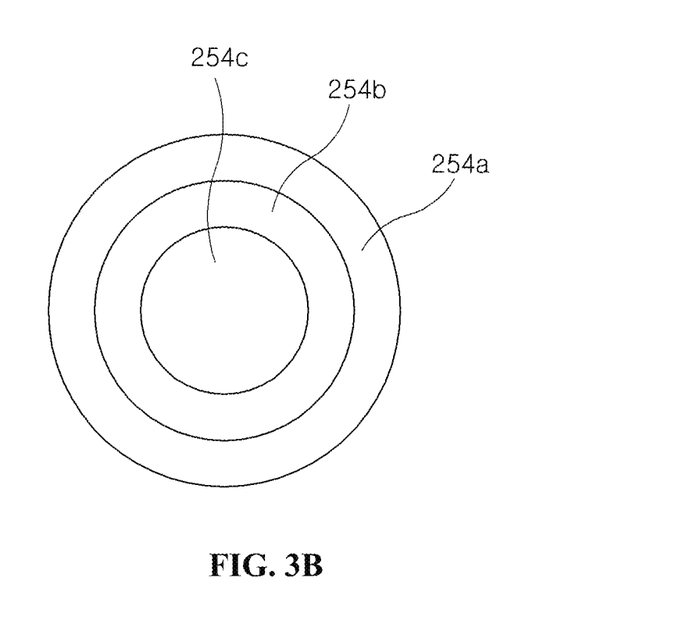
FIGS. 3B and 3C are schematic plan views of the reflective pattern sheet according to the embodiment of the present disclosure.
Figure 3C:
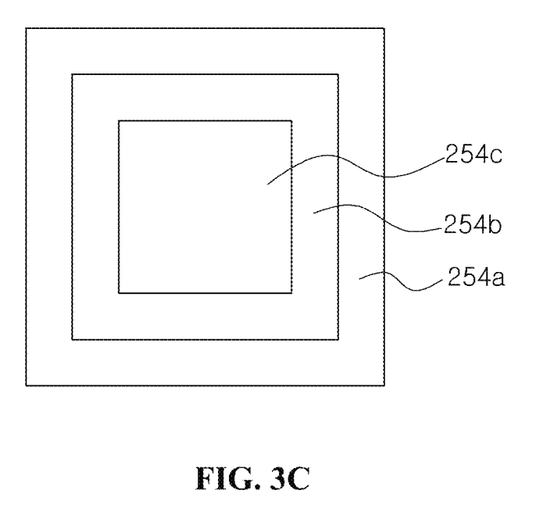

FIG. 3A is a schematic cross-sectional view of a reflective pattern sheet according to the embodiment of the present disclosure, and FIGS. 3B and 3C are schematic plan views of the reflective pattern sheet according to the embodiment of the present disclosure. FIGS. 3A to 3C show the first reflective pattern.

In FIG. 3A, the first reflective pattern 254 of the reflective pattern sheet 250 according to the embodiment of the present disclosure includes a first pattern layer 254a, a second pattern layer 254b and a third pattern layer 254c sequentially formed on a base substrate 252. For example, the first, second and third pattern layers 254a, 254b and 254c can be formed of titanium oxide (TiO$_2$).

Here, an area of the second pattern layer 254b is smaller than an area of the first pattern layer 254a, and an area of the third pattern layer 254c is smaller than the area of the second pattern layer 254b. That is, the area of the second pattern layer 254b is smaller than the area of the first pattern layer 254a and larger than the area of the third pattern layer 254c. Further, centers of the first, second and third pattern layers 254a, 254b and 254c are located on the same line. In other words, the second and third pattern layers 254b and 254c are positioned on the central portion of the first pattern layer 254a.

Accordingly, a center portion of the first reflective pattern 254 in which the first, second and third pattern layers 254a, 254b and 254c are stacked has the lowest light transmittance, an edge portion of the first reflective pattern 254 in which only the first pattern layer 254a is located has the highest light transmittance, and a portion of the first reflective pattern 254 in which the first and second pattern layers 254a and 254b are stacked has a light transmittance higher than that of the center portion of the first reflective pattern 254 and lower than that of the edge portion of the first reflective pattern 254. However, the structure of the first reflective pattern 254 of the present invention is not limited thereto. In other alternative embodiments, the first reflective pattern 254 may be formed of a single layer with different thickness. For example, the thickness of the central portion of the single-layered first reflective pattern may be thicker than thickness of the edge portion thereof. Different transmittances may also be achieved with such structures The first reflective pattern 254 can have a circular shape in plan view as shown in FIG. 3B or a tetragonal shape in plan view as shown in FIG. 3C, but the present disclosure is not limited thereto.

In addition, the second reflective pattern 256 can have different transmittance depending on a position, and such a second reflective pattern 256 can have the same structure as the first reflective pattern 254.

Referring back to FIG. 1 and FIG. 2, the fluorescent sheet 270 can be disposed on the diffusion plate 260. The fluorescent sheet 270 can include at least one fluorescent substance absorbing a part of first color light generated in the LED package 220 and generating light of at least one color different from the first color.

In the case of using the fluorescent sheet 270, the first color light generated in the LED package 220 and the light of the color generated by the fluorescent sheet 270 are mixed to finally produce white light, and the white light can be provided to the liquid crystal panel 300.

For example, when the LED package 220 generates blue light as the first color light, the fluorescent sheet 270 can absorb a part of the blue light and generate yellow light as a second color light.

Alternatively, when the LED package 220 generates white light, the fluorescent sheet 270 can be omitted.

The optical sheet 280 including at least one sheet can be disposed on the fluorescent sheet 270. The at least one sheet can be a light-concentrating sheet, for example. In the embodiment of the present disclosure, the optical sheet 280 includes three sheets, but the present disclosure is not limited thereto.

The liquid crystal panel 300 is disposed over the backlight unit 200. The liquid crystal panel 300 controls light transmittance of a liquid crystal layer and displays an image. The liquid crystal panel 300 can include a first substrate (or a lower substrate) 301, a second substrate (or an upper substrate) 302 facing and attached to the first substrate 301, and a liquid crystal layer (not shown) interposed between the first and second substrates 301 and 302. On the other hand, although not shown in the figures, a first polarizer and a second polarizer can be attached to outer surfaces of the first substrate 301 and the second substrate 302, respectively.

In the liquid crystal panel 300, the liquid crystal layer can be operated for each pixel by an electric field, which is generated by a data voltage and a common voltage applied to each pixel, and thus a color image can be displayed according the light transmittance of the liquid crystal layer.

The panel driving portion 310 can be connected to a pad portion provided on the first substrate 301 and drive each pixel of the liquid crystal panel 300. For example, the panel driving portion 310 can include a plurality of circuit films 311 connected to the pad portion of the liquid crystal panel 300, a data IC 313 mounted on each circuit film 311, a display printed circuit board 312 connected to the circuit films 311, and a timing control circuit 314 mounted on the display printed circuit board 312.

The timing control circuit 314 can sort and process digital image data input from an external driving system (not shown) to generate pixel data for respective pixels of the liquid crystal panel 300, in response to timing synchronization signals supplied from the external driving system, and supply the pixel data to the data IC 313. In addition, the timing control circuit 314 can generate a data control signal and a gate control signal based on the timing synchronization signals to control driving timing of each of the data IC 313 and a gate IC (not shown).

Further, the timing control circuit 314 can control an emission operation of the backlight unit 200 according to a local timing method and individually control brightness of the liquid crystal panel 300 for each region.

As describe above, in this embodiment, since the backlight unit 200 is a direct-type backlight unit, the local dimming method in which the liquid crystal panel 300 is driven for each region can be realized. Thus, a contrast ratio can be improved, and power consumption can be reduced.

Further, since the reflective pattern sheet 250, which includes the first reflective patterns 254 corresponding to the respective LED packages 220, is provided, light output in the vertical upward direction can be reduced, and the hot spot can be prevented, thereby improving the image quality.

In addition, the light can be reflected by the reflective pattern sheet 250 and travel in the side direction, and thus an optical gap of the direct-type backlight unit 200 can be reduced. Accordingly, a thickness of the backlight unit 200 can be decreased, and the liquid crystal display device 10 in a thin profile can be implemented.

Moreover, since the partition wall 240 surrounding at least one LED package 220 is provided, the path of light emitted from the LED package 220 can be changed, and the halo phenomenon can be prevented during the local dimming operation.

Figure 4:
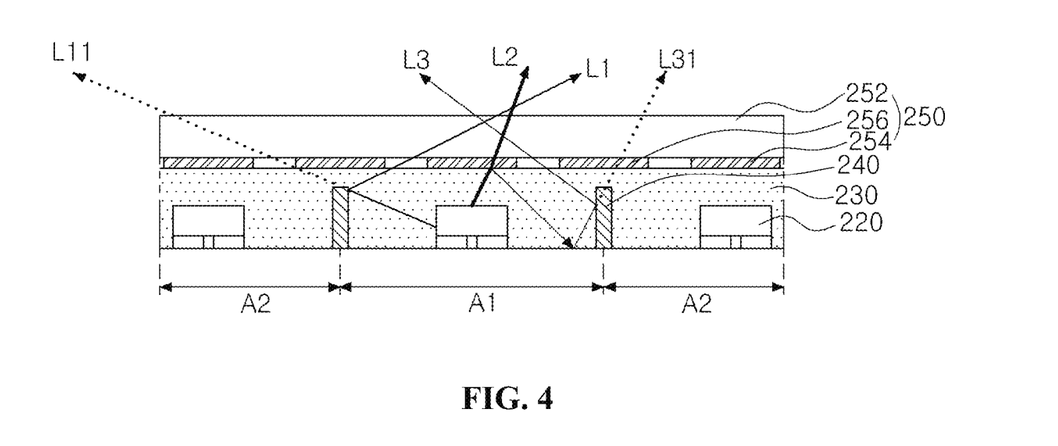
FIG. 4 is a cross-sectional view schematically showing a path of light in a backlight unit according to the embodiment of the present disclosure.

FIG. 4 is a cross-sectional view schematically showing a path of light in a backlight unit according to the embodiment of the present disclosure.

In FIG. 4, when the local dimming operation is performed, light is output only from the LED package 220 in a first region A1, which is a local dimming region, and light is not output from the LED package 220 in a second region A2, which is a non-local dimming region.

Here, first light L1, which is emitted in a side direction from the LED package 220 of the first region A1 and travels toward the second region A2, is totally reflected or reflected by the partition wall 240, transmitted by the reflective pattern sheet 250 in the first region A1, and then provided to the diffusion plate 260.

In addition, second light L2, which is a part of light emitted upwardly from the LED package 220 of the first region A1 and traveling toward the first reflective pattern 254 in the first region A1, is transmitted by the first reflective pattern 254 in the first region A1 and provided to the diffusion plate 260.

Further, third light L3, which is a remaining part of the light emitted upwardly from the LED package 220 of the first region A1 and traveling toward the first reflective pattern 254 in the first region A1, is reflected by the first reflective pattern 254 in the first region A1, reflected by a surface of the circuit board 210, totally reflected or reflected by the partition wall 240, transmitted by the reflective pattern sheet 250 in the first region A1, and then provided to the diffusion plate 260.

Accordingly, when the local dimming operation is performed, the first light L1, the second light L2, and the third light L3 emitted from the LED package 220 in the first region A1, which is the local dimming region, are output only in the first region A1 and are not output in the second region A2, which is the non-local dimming region.

On the other hand, if the partition wall 240 does not exist, light L11, which is emitted in the side direction from the LED package 220 of the first region A1 and travels toward the second region A2, is transmitted by the reflective pattern sheet 250 in the second region A2 and is provided to the diffusion plate 260. In addition, light L31, which is emitted upwardly from the LED package 220 of the first region A2 and is reflected by the first reflective pattern 254 in the first region A1, is reflected by a surface of the circuit board 210, is transmitted by the reflective pattern sheet 250 in the second region A2, and is provided to the diffusion plate 260. Accordingly, when the local dimming operation is performed, the lights L11 and L31 emitted from the LED package 220 of the first region A1, which is the local dimming region, are output in the second region A2, which is the non-local dimming region, thereby causing the halo phenomenon.

As describe above, in the embodiment of the present disclosure, since the partition wall 240 is formed between adjacent LED packages 220, during the local dimming operation, it is possible to prevent the halo phenomenon in which light is output beyond the local dimming region.

The partition wall 240 according to the embodiment of the present disclosure can have various structures, and this will be described with reference to FIGS. 5A to 5C.

Figure 5A:
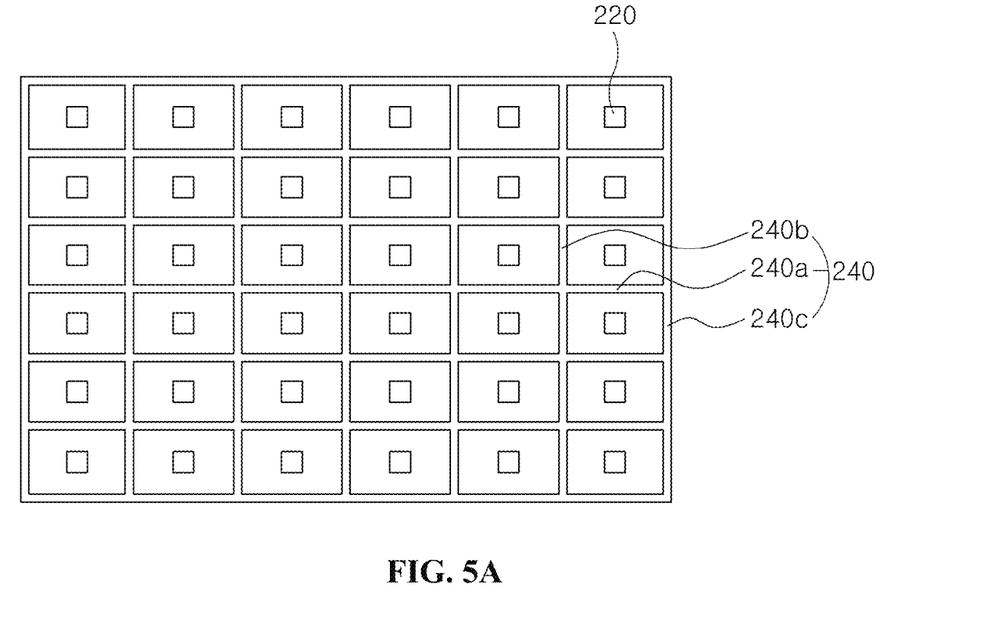
FIGS. 5A to 5C are plan view schematically showing structures of a partition wall according to the embodiment of the present disclosure.
Figure 5B:
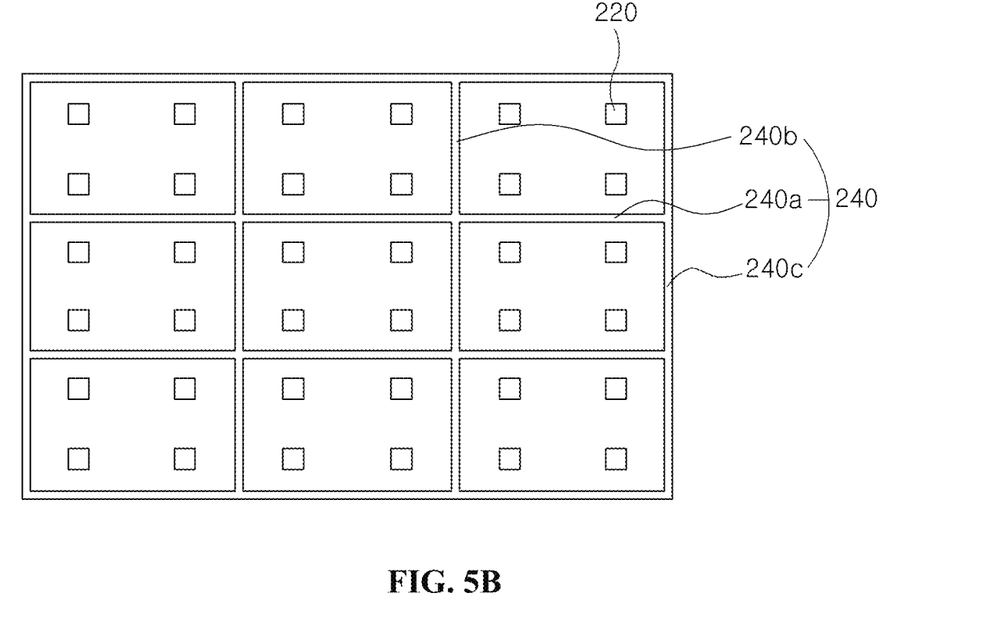
Figure 5C:
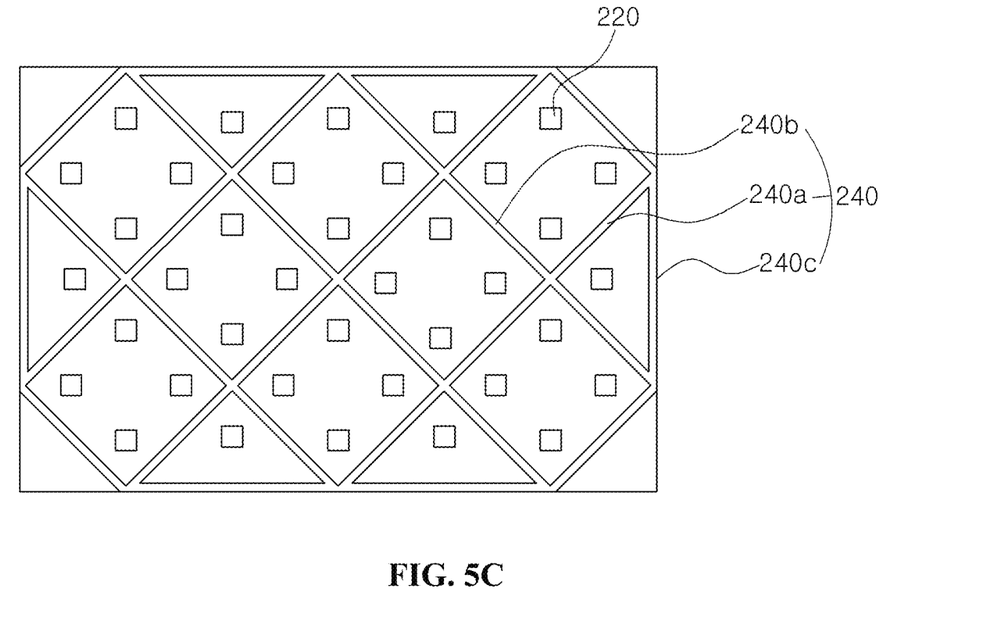

FIGS. 5A to 5C are plan view schematically showing structures of a partition wall according to the embodiment of the present disclosure.

In FIGS. 5A to 5C, the partition wall 240 according to the embodiment of the present disclosure can include first portions 240a in a first direction, second portions 240b in a second direction crossing the first direction, and a third portion 240c connected ends of the first and second portions 240a and 240b and surrounding the first and second portions 240a and 240b. Here, the first portions 240a and the second portions 240b cross each other, but the present disclosure is not limited thereto.

As shown in FIG. 5A, one LED package 220 can be surrounded by the partition wall 240. In this case, the LED packages 220 can be spaced apart from each other and disposed with respective predetermined distances therebetween in the first direction and the second direction, and a part of the partition wall 240 surrounding one LED package 220 can have a rectangular or square shape.

Alternatively, as shown in FIGS. 5B and 5C, four LED packages 220 can be surrounded by the partition wall 240. In this case, the LED packages 220 can be spaced apart from each other and disposed with respective predetermined distances therebetween in the first direction and the second direction, and a part of the partition wall 240 surround four LED packages 220 can have a rectangular or square shape of FIG. 5B or have a rhombic shape of FIG. 5C.

The partition wall of the present disclosure can be variously configured, and configurations of the partition wall according to various embodiments of the present disclosure will be described hereinafter in detail with reference to drawings.

First Embodiment

Figure 6A:
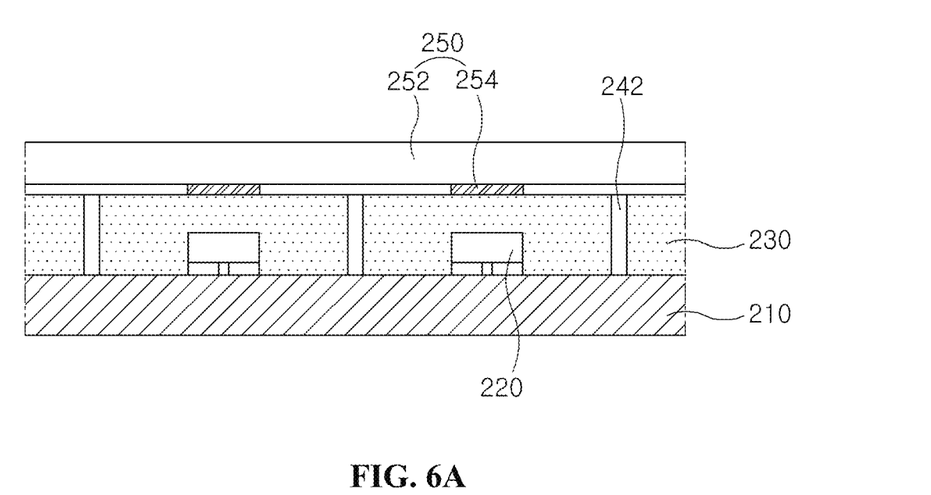
FIGS. 6A and 6B are schematic cross-sectional views of a backlight unit including a partition wall according to a first embodiment of the present disclosure.
Figure 6B:
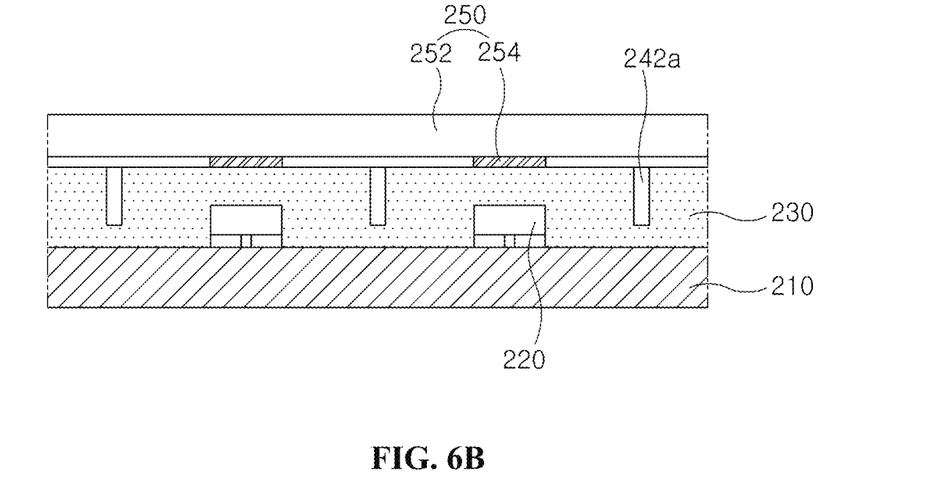

FIGS. 6A and 6B are schematic cross-sectional views of a backlight unit including a partition wall according to a first embodiment of the present disclosure. Here, the same reference numerals are given to the same parts as those of the previous embodiment, and a description thereof will be omitted or simplified.

In FIGS. 6A and 6B, the partition wall 242 and 242a of the backlight unit according to the first embodiment of the present disclosure can be configured as a groove formed in the encapsulation member 230. At this time, the side surface of the partition wall 242 and 242a can be substantially perpendicular to the circuit board 210. Alternatively, the side surface of the partition wall 242 and 242a can be inclined at a predetermined angle with respect to the circuit board 210, but the present disclosure is not limited thereto.

As shown in FIG. 6A, the height of the partition wall 242, i.e., a depth of the groove can be substantially the same as the thickness of the encapsulation member 230. Alternatively, as shown in FIG. 6B, the height of the partition wall 242a can be smaller than the thickness of the encapsulation member 230, and the partition wall 242a can be formed to have a predetermined height from a top surface of the encapsulation member 230, that is, a surface of the encapsulation member 230 contacting the reflective pattern sheet 250. Here, the partition wall 242 of FIG. 6A is more effective than the partition wall 242a of FIG. 6B for preventing the halo phenomenon.

The partition wall 242 and 242a has a lower refractive index than that of the encapsulation member 230 and totally reflects light from the LED package 220, thereby preventing the halo phenomenon during the local dimming operation.

At this time, the width of the partition wall 242 and 242a according to the first embodiment of the present disclosure can be ¼ of the pitch p of the LED package 220. Here, the second reflective pattern 256 of FIG. 2 over the partition wall 242 and 242a can be omitted.

Second Embodiment

Figure 7A:
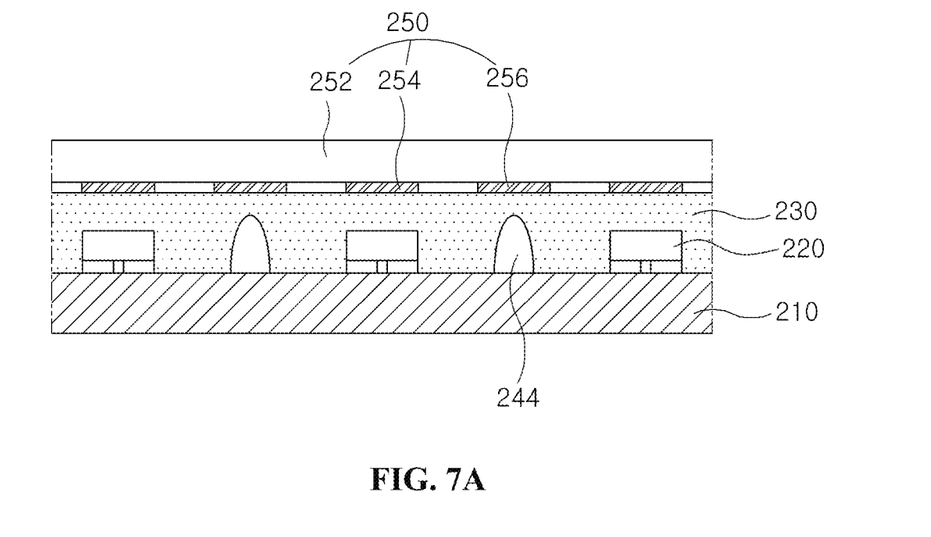
FIGS. 7A and 7B are schematic cross-sectional views of a backlight unit including a partition wall according to a second embodiment of the present disclosure.
Figure 7B:
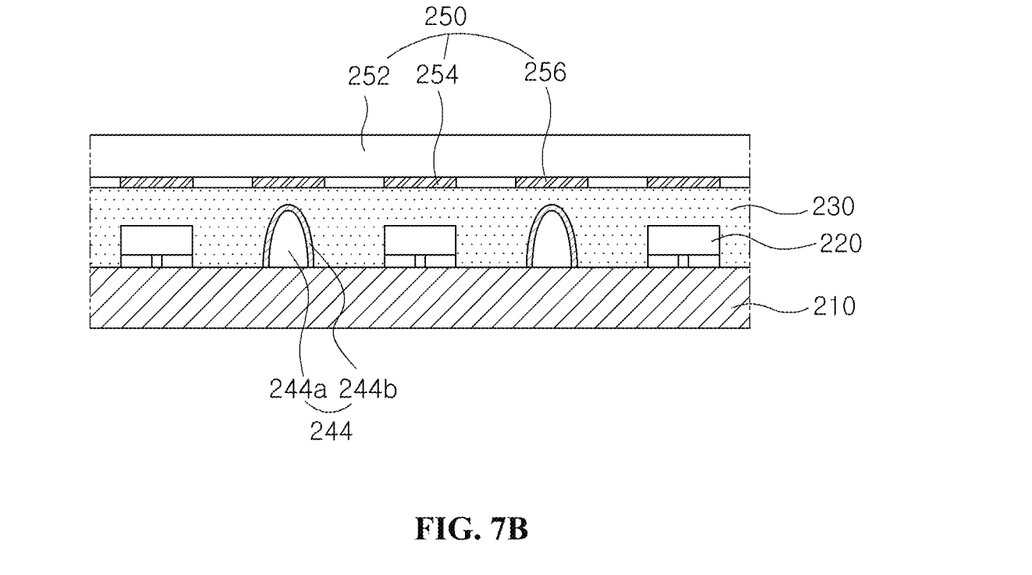

FIGS. 7A and 7B are schematic cross-sectional views of a backlight unit including a partition wall according to a second embodiment of the present disclosure. Here, the same reference numerals are given to the same parts as those of the previous embodiment, and a description thereof will be omitted or simplified.

As shown in FIG. 7A, the partition wall 244 of the backlight unit according to the second embodiment of the present disclosure can be formed of a separate resin. Here, the partition wall 244 has a lower refractive index than that of the encapsulation member 230. The halo phenomenon can be more effectively prevented as a difference between the refractive indexes of the partition wall 244 and the encapsulation member 230 increases. For example, the difference between the refractive indexes of the partition wall 244 and the encapsulation member 230 can be 0.1 or more, but the present disclosure is not limited thereto.

The side surface of the partition wall 244 can be substantially inclined with respect to the circuit board 210. The side surface of the partition wall 244 can have a variable inclination depending on a position, but the present disclosure is not limited thereto.

The height of the partition wall 244 can be equal to or greater than the height of the LED package 220 and smaller than or equal to the thickness of the encapsulation member 230.

The partition wall 244 totally reflects light from the LED package 220, thereby preventing the halo phenomenon during the local dimming operation. Here, it is more effective for preventing the halo phenomenon that the height of the partition wall 244 is smaller than the thickness of the encapsulation member 230.

At this time, the second reflective pattern 256 can be disposed over the partition wall 244 and control a bright line and/or dark line due to the partition wall 244.

Meanwhile, as shown in FIG. 7B, the partition wall 244 of the backlight unit according to the second embodiment of the present disclosure can include a resin layer 244a of a separate resin and a reflective layer 244b covering the resin layer 244a. Here, the reflective layer 244 includes a reflective material for reflecting light. For example, the reflective material can be titanium oxide ($TiO_2$), silver (Ag) or aluminum (Al), but the present disclosure is not limited thereto.

The side surface of the partition wall 244 can be substantially inclined with respect to the circuit board 210. The side surface of the partition wall 244 can have a variable inclination depending on a position, but the present disclosure is not limited thereto.

The height of the partition wall 244 can be equal to or greater than the height of the LED package 220 and smaller than or equal to the thickness of the encapsulation member 230.

The reflective layer 244b of the partition wall 244 reflects light from the LED package 220, thereby preventing the halo phenomenon during the local dimming operation. Here, it is more effective for preventing the halo phenomenon that the height of the partition wall 244 is smaller than the thickness of the encapsulation member 230.

At this time, the second reflective pattern 256 can be disposed over the partition wall 244 and control a bright line and/or dark line due to the partition wall 244.

Third Embodiment

Figure 8:
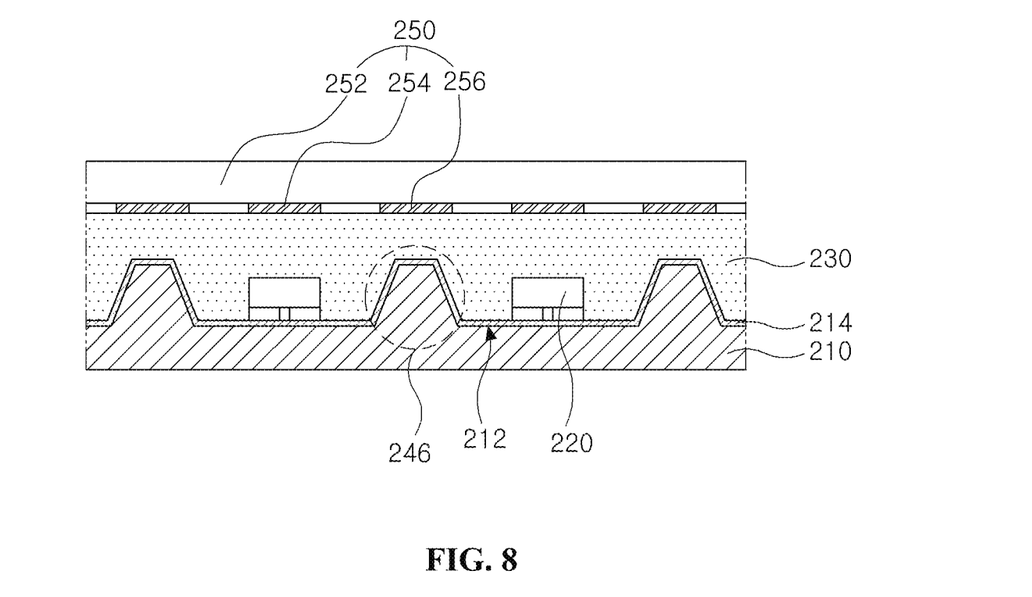
FIG. 8 is a schematic cross-sectional view of a backlight unit including a partition wall according to a third embodiment of the present disclosure.

FIG. 8 is a schematic cross-sectional view of a backlight unit including a partition wall according to a third embodiment of the present disclosure. Here, the same reference numerals are given to the same parts as those of the previous embodiment, and a description thereof will be omitted or simplified.

As shown in FIG. 8, the partition wall 246 of the backlight unit according to the third embodiment of the present disclosure can be configured as protruding portions of the circuit board 210.

More specifically, the circuit board 210 can have depressed portions 212 and the protruding portion between adjacent depressed portions 212, and the partition wall 246 of the backlight unit according to the third embodiment of the present disclosure can be composed of the protruding portions.

Meanwhile, a reflective layer 214 can be further formed on a surface of the circuit board 210 having the depressed portions 212 and the protruding portions, and in this case, the partition wall 246 of the backlight unit according to the third embodiment of the present disclosure can be the protrusions of the circuit board 210 on which the reflective layer 214 is formed.

The reflective layer 214 can be formed of white photo solder resist or titanium oxide ($TiO_2$), but the present disclosure is not limited thereto.

The height of the partition wall 246, i.e., a height of the protrusion or a depth of the depressed portion 212 can be equal to or greater than the height of the LED package 220 and smaller than or equal to the thickness of the encapsulation member 230.

The side surface of the partition wall 246 can be substantially inclined with respect to the circuit board 210. Alternatively, the side surface of the partition wall 246 can be substantially perpendicular to the circuit board, but the present disclosure is not limited thereto.

The partition wall 246 reflects light from the LED package 220, thereby preventing the halo phenomenon during the local dimming operation. Here, it is more effective for preventing the halo phenomenon that the height of the partition wall 246 is smaller than the thickness of the encapsulation member 230.

At this time, the second reflective pattern 256 can be disposed over the partition wall 246 and control a bright line and/or dark line due to the partition wall 246.

As described above, according to the embodiments of the present disclosure, the reflective pattern is disposed over the LED package, and the diffusion means such as the diffusion plate is disposed thereover. Thus, light is prevented from being output upwardly from the LED package, and the optical distance can be decreased. Accordingly, the mura such as the hot spot can be prevented, thereby improving the image quality, and the backlight unit and the liquid crystal display device in a thin profile can be implemented.

Further, since the partition wall is formed between adjacent LED packages, during the local dimming operation, it is possible to prevent the halo phenomenon in which light is output beyond the local dimming region, and thus the backlight unit and the liquid crystal display panel can be realized to providing an image of a high quality.

It will be apparent to those skilled in the art that various modifications and variations can be made in the backlight unit and the liquid crystal display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A backlight unit, comprising:
a circuit board;
a plurality of LED packages mounted on the circuit board;
a partition wall on the circuit board and surrounding at least one LED package;
an encapsulation member covering the plurality of LED packages and the partition wall; and
a reflective pattern sheet over the encapsulation member and including a plurality of first reflective patterns corresponding to the plurality of LED packages, respectively,
wherein a height of the partition wall is equal to or greater than a height of the at least one LED package and smaller than or equal to a thickness of the encapsulation member,
wherein the encapsulation member is in contact with both the partition wall and the at least one LED package, and
wherein the reflective pattern sheet further includes a second reflective pattern corresponding to the partition wall, and the second reflective pattern has a same structure as the first reflective pattern.

2. The backlight unit of claim 1, wherein a width of the partition wall is ⅕ to ¼ of a pitch of the plurality of LED packages.

3. The backlight unit of claim 1, wherein the partition wall includes first portions in a first direction, second portions in a second direction crossing the first direction, and a third portion connected to ends of the first and second portions and surrounding the first and second portions.

4. The backlight unit of claim 3, wherein the partition wall is configured as a groove formed in the encapsulation member.

5. The backlight unit of claim 3, wherein the partition wall is formed of a resin having a lower refractive index than that of the encapsulation member.

6. The backlight unit of claim 3, wherein the partition wall includes a resin layer and a reflective layer covering the resin layer.

7. The backlight unit of claim 3, wherein the circuit board has a depressed portion corresponding to the at least one LED package and a protruding portion adjacent to the depressed portion, and the partition wall is composed of the protruding portion.

8. The backlight unit of claim 1, wherein a transmittance of each first reflective pattern increases from a center portion to an edge portion.

9. The backlight unit of claim 8, wherein the first reflective pattern includes first, second and third pattern layers sequentially stacked, and an area of the second pattern layer is smaller than an area of the first pattern layer and greater than an area of the third pattern layer.

10. The backlight unit of claim 9, wherein the second and third pattern layers are positioned on central portion of the first pattern layer.

11. The backlight unit of claim 8, wherein each first reflective pattern is formed of a single layer with its thickness gradually decreasing from the center portion to the edge portion.

12. The backlight unit of claim 1, further comprising at least one of a diffusion plate, a fluorescent sheet and an optical sheet over the reflective pattern sheet.

13. The backlight unit of claim 1, wherein the partition wall is disposed between adjacent first reflective patterns.

14. The backlight unit of claim 1, wherein a distance between the partition wall and the at least one LED package is ½ of a distance between centers of adjacent LED packages.

15. The backlight unit of claim 1, wherein a width of the second reflective pattern is equal to a width of the first reflective pattern.

16. A backlight unit, comprising:
a circuit board;
a plurality of LED packages mounted on the circuit board;
a partition wall disposed among the plurality of LED packages to partially or entirely surround one or more LED packages, and changing a transmitting direction of at least 40% of the light incident on the partition wall;
an encapsulation member covering the plurality of LED packages and the partition wall; and
a reflective pattern sheet over the plurality of LED packages and including a plurality of first reflective patterns corresponding to the plurality of LED packages, respectively,
wherein a height of the partition wall is equal to or greater than a height of the at least one LED package,
wherein the encapsulation member is in contact with both the partition wall and the at least one LED package, and
wherein the reflective pattern sheet further includes a second reflective pattern corresponding to the partition wall, and the second reflective pattern has a same structure as the first reflective pattern.

17. The backlight unit of claim 16, wherein the partition wall changing the transmitting direction the light incident on the partition wall by way of reflecting, refracting and/or diffusing.

18. The backlight unit of claim 16, wherein the encapsulation member is positioned between the reflective pattern sheet and the plurality of LED packages.

19. A liquid crystal display device, comprising:
a liquid crystal panel; and
a backlight unit under the liquid crystal panel and including:
a circuit board;
a plurality of LED packages mounted on the circuit board;
a partition wall on the circuit board and surrounding at least one LED package;
an encapsulation member covering the plurality of LED packages and the partition wall; and
a reflective pattern sheet over the encapsulation member and including a plurality of first reflective patterns corresponding to the plurality of LED packages, respectively,
wherein a height of the partition wall is equal to or greater than a height of the at least one LED package and smaller than or equal to a thickness of the encapsulation member,
wherein the encapsulation member is in contact with both the partition wall and the at least one LED package, and
wherein the reflective pattern sheet further includes a second reflective pattern corresponding to the partition wall, and the second reflective pattern has a same structure as the first reflective pattern.

20. A liquid crystal display device, comprising:
a liquid crystal panel; and
a backlight unit under the liquid crystal panel and including:
a circuit board;
a plurality of LED packages mounted on the circuit board;
a partition wall disposed among the plurality of LED packages to partially or entirely surround one or more LED packages, and changing a transmitting direction of at least 40% of the light incident on the partition wall;
an encapsulation member covering the plurality of LED packages and the partition wall; and
a reflective pattern sheet over the plurality of LED packages and including a plurality of first reflective patterns corresponding to the plurality of LED packages, respectively,
wherein a height of the partition wall is equal to or greater than a height of the at least one LED package,
wherein the encapsulation member is in contact with both the partition wall and the at least one LED package, and
wherein the reflective pattern sheet further includes a second reflective pattern corresponding to the partition wall, and the second reflective pattern has a same structure as the first reflective pattern.

* * * * *